United States Patent [19]

Losic et al.

[11] Patent Number: 4,973,174

[45] Date of Patent: Nov. 27, 1990

[54] PARAMETER-FREE SYNTHESIS OF ZERO-IMPEDANCE CONVERTER

[76] Inventors: Novica A. Losic, 4755-79 Street, Kenosha, Wis. 53142; Ljubomir Dj. Varga, Deskaseva 6, 11000 Belgrade, Yugoslavia

[21] Appl. No.: 484,494

[22] Filed: Feb. 26, 1990

[51] Int. Cl.[5] .............................................. H02P 2/00

[52] U.S. Cl. .................................. 388/811; 388/815; 388/813; 388/809; 318/608; 318/618; 318/811; 318/812

[58] Field of Search ............................... 323/285-287; 363/21, 97; 318/615-618, 650, 825-829, 830-831, 809, 811, 798, 807, 812; 388/809-815, 606-608

[56] References Cited

U.S. PATENT DOCUMENTS

| | | | |
|---|---|---|---|
| 4,293,812 | 10/1981 | Kubach et al. | 323/286 |
| 4,456,872 | 6/1984 | Froeschle | 323/286 |
| 4,459,534 | 7/1984 | Nagase et al. | 318/811 X |
| 4,578,631 | 3/1986 | Smith | 323/282 |
| 4,617,675 | 10/1986 | Ashikaga et al. | 218/811 X |
| 4,672,518 | 6/1987 | Murdock | 363/21 |
| 4,779,183 | 10/1988 | Mutah et al. | 318/811 X |
| 4,876,494 | 10/1989 | Daggett et al. | 318/560.22 |
| 4,885,674 | 12/1989 | Varga et al. | 363/97 X |

*Primary Examiner*—William M. Shoop, Jr.
*Assistant Examiner*—D. Martin

[57] ABSTRACT

A method of synthesizing a system which forces finite value of an impedance to zero comprising a positive current feedback of a prescribed functionalism and a negative voltage feedback to ensure stability of the system. The prescribed functionalism of the current loop uses arithmetic elements as well as voltage and current measurements to provide for a parameter-free synthesis of the converter whereby the converter operates in the measurement-based mode, the measured variables being the voltage and the current associated with the impedance of interest, without a need to supply values of both resistive and reactive components of the impedance of interest. The converter is used in synthesizing electric motor drive systems, incorporating any kind of motor, of infinite disturbance rejection ratio and zero-order dynamics and without specifying the resistive and the inductive values of the motor impedance.

18 Claims, 2 Drawing Sheets

PARAMETER-FREE SYNTHESIS OF ZERO-IMPEDANCE CONVERTER

FIELD OF THE INVENTION

This invention relates to circuits and systems and more particularly to electric motor drive systems using a parameter-free zero-impedance converter to provide for an infinite disturbance rejection ratio and zero-order dynamics without specifying resistive and inductive values of the motor impedance.

BACKGROUND OF THE INVENTION

In the circuit and system theory and in the practice it is of interest to minimize an impedance of interest. Further, in order to achieve mathematically complete, and thus ideal, loan independent operation, it can be shown that an impedance of interest should be forced to zero. All known techniques produce less or more successful minimization of the impedance of interest, usually in proportion to their complexity. None of the presently known techniques produces a zero impedance, except a synthesis methods described in a copending and coassigned applications by these same two inventors Lj. Dj. Varga and N. A. Losic, "Synthesis of Zero-Impedance Converter", Ser No. 07/452,000, December 1989, and "Synthesis of Improved Zero-Impedance Converter", by N. A. Losic and Lj. Dj. Varga, Ser. No. 07/457,158, December 1989. A specific and particular applications of a zero-impedance converter, in addition to those in the applications above, are described in the U.S. Pat. No. 4,885,674 "Synthesis of Load-Independent Switch-Mode Power Converters" by Lj. Dj. Varga and N. A. Losic, issued December 1989, as well as in a two copending and coassigned applications of N. A. Losic and Lj. Dj. Varga "Synthesis of Load-Independent DC Drive System", Ser. No. 07/323,630, November 1988, "Synthesis of Load-Independent AC Drive Systems", Ser. No. 07/316,664, February 1989, (allowed for issuance December 1989)

Another advantage due to the use of the zero-impedance converter, seen in creating a possibility to reduce order of an electric motor drive system to zero by implementing appropriate (feed)forward algorithms if the system uses the zero-impedance converter (to produce a load-independent operation) is explored and described in a copending and coassigned application by N. A. Losic and Lj. Dj. Varga "Synthesis of Drive Systems of Infinite Disturbance Rejection Ratio and Zero-Dynamics/Instantaneous Response", January 1990. Furthermore, a generalized synthesis method to produce zero-order dynamics/instantaneous response and infinite disturbance rejection ratio in a general case of control systems of n-th order is described in a copending and coassigned application by Lj. Dj. Varga and N. A. Losic "Generalized Synthesis of Control Systems of Zero-Order/Instantaneous Response and Infinite Disturbance Rejection Ratio", February 1990.

The zero-impedance converter and its particular and specific applications, as described in the patents/patent applications on behalf of these two inventors listed above, operate on a specified/given values of a resistive and a reactive parts of an impedance of interest. If the impedance of interest is of inductive nature a differentiation is to be performed as a part of the functioning of the zero-impedance converter. A differentiation-free generalized synthesis of control systems to produce a zero order and an infinite disturbance rejection ratio constitutes a part of the last application listed above.

SUMMARY OF THE INVENTION

It is therefore an object of the present invention to provide a parameter-free synthesis method, which includes elimination of differentiation in cases of inductive impedances, to produce a parameter-free zero-impedance converter, operating without specifying resistive and reactive parts of the impedance of interest, and to achieve an infinite disturbance rejection ratio and to use it to further achieve a zero-order dynamics, with associated instantaneous response to an input command, in electric motor drive systems including dc, synchronous and asynchronous ac, and step motors. These applications are not exclusive; the parameter-free zero-impedance converter can be used in any application which can make use of its properties.

Briefly, for use with an electric motor drive system, the preferred embodiment of the present invention includes a positive current feedback loop and a negative voltage feedback loop(s) with a prescribed functionalism in the current loop synthesized such that it obtains a generalized voltage phasor $$\hat{V} = V_{rms} \sphericalangle_v$$

and a generalized current phasor $$\hat{I} = I_{rms} \sphericalangle_i,$$

where $V_{rms}$ and $I_{rms}$ are true values of voltage and current associated with an electric motor generalized impedance $\hat{Z} = \hat{V}/\hat{I}$ and $\sphericalangle_v$ and $\sphericalangle_i$ are instantaneous phases of the respective generalized phasors, and further such that it performs arithmetic functions of magnitude division and multiplication and phase subtraction and addition (phase shifting). The instantaneous value of a current feedback signal KRi(t) is multiplied with a magnitude of a real part of a transfer function H(s) and the instantaneous phase of the current feedback signal KRi(t) is shifted for a phase of the real part of the transfer function H(s) wherein $$|Re[H(s)]| = V_{rms}/[RAKI_{rms}/(1 = AK_eK_f)] \quad (1)$$

or $$|Re[H(s)]| = V_{rms}/RAKI_{rms} \quad (2)$$

depending on whether the negative voltage feedback loop is closed internally or externally with respect to the parameter-free zero-impedance converter, respectively, and $$\sphericalangle\{Re[H(s)]\} = \sphericalangle_v \sphericalangle_i \quad (3)$$

In Eqs.(1) and (2) R is transresistance of a current sense device. K is gain constant of a buffering amplifier in the current loop, A is voltage gain of a pulse width modulated (PWM) control and power stage, $K_e$ is gain constant in an internally closed negative feedback voltage loop, and $K_f$ is gain constant in a forward path of the parameter-free zero-impedance converter incorporating the internal negative feedback voltage loop.

In addition to providing for an infinite disturbance rejection ratio the algorithms in Eqs.(1) and (3) or in Eqs.(2) and (3), depending again whether the internal or external negative voltage feedback is used, respectively, also reduce the order of the system transfer function making it possible to further reduce this order to zero, i.e., to provide for the transfer function of the system being equal to a constant, by incorporating a (feed)forward algorithms which, in case of internally closed negative feedback loop with respect to the parameter-free zero-impedance converter, are $$K_i = mK_mK_e \quad (4)$$

$$K_i' = mK_m/A \quad (5)$$

while in case of the externally closed negative feedback loop(s), the (feed)forward algorithms are $$K_i = mK_{enc}K_g \quad (6)$$

$$K_i' = mK_v \quad (7)$$

$$K_i'' = mK_m/A \quad (8)$$

In Eqs.(4) and (5) $K_i$ is a gain constant of a direct path circuit and $K_i'$ is a gain constant of a feedforward circuit. In Eqs.(6), (7), and (8) $K_i$ is a gain constant of a position direct path circuit, $K_i'$ is a gain constant of a velocity direct path circuit, and $K_i''$ is a gain constant of a feedforward circuit. In Eqs.(4) through (8) m is a constant providing scaling between input and output of the system, i.e., the system transfer function becomes m, $K_{enc}$ is digital encoder gain constant in [pulses/radian], $K_g$ is gear ratio of a gear box mounted between motor shaft and encoder, $K_v$ is tach gain constant in [Volts/-rad/sec], $K_m$ is a back electromotive force (emf) constant (which characterizes the back emf production in any electric motor with constant air-gap flux), and A and $K_e$ are constants described in connection with Eqs.(1) and (2).

The ability to provide a parameter-free zero-impedance converter, operating in a self-sufficient and self-adaptive/self-tunable way based on continuous and real time measurements of voltage and current associated with the impedance of interest rather than on specifying the impedance real and reactive parts, and implicitly differentiation-free in cases of inductive impedances, is a material advantage of the present invention. By forcing an inductive impedance (as in electric motors) to zero, an instantaneous change of current through the inductive impedance can be effected Alternatively, an instantaneous change of voltage across a capacitive impedance can be achieved. By forcing an electric motor impedance to zero, the parameter-free zero-impedance converter provides for an infinite disturbance rejection ratio, i.e., load independence, of the drive system and makes it possible to further achieve a zero-order dynamics with additional (feed)forward algorithms.

Other advantages of the present invention include its ability to be realized in an integrated-circuit form; the provision of such a method which needs not specifying the resistive and the reactive parts of the impedance of interest, which, in general, can change due to a temperature change, eddy currents and skin effect (resistance) or due to magnetic saturation (inductance) in case of electric motors; the provision of such a method which provides zero output-angular-velocity/position-change-to-load-torque-change transfer function in both transient and steady state; and the provision of such a method which provides constant output-angular-velocity/position-to-change-to-input-command/reference-change transfer function in both transient and steady state.

As indicated by Eqs.(1), (2), and (3), the circuit realization of the corresponding algorithms in the positive current feedback loop is independent of the impedance of interest and based on using a generalized voltage and current phasors, which indeed are a mathematical representation of variables provided by continuous and in-real-time measurements of voltage and current associated with the impedance of interest, and using arithmetic elements to perform mathematical functions such as magnitude division and multiplication and phase subtraction and addition. The (feed)forward algorithms, as seen from Eqs.(4) through (8), are realized as a constant-gain circuits.

The algorithms in Eqs.(1) through (8) are independent of a mechanisms of producing a torque in an electric motor, these mechanisms being nonlinear in cases of ac and step motors, as well as they are independent of a system moment of inertia, and thus of a mass, and of a viscous friction coefficient, and of a nonlinear effects associated with the dynamical behavior of the drive system within its physical limits. The independence of the system moment of inertia implies infinite robustness of the drive system with respect to this parameter. These algorithms therefore represent the most ultimate ones, as they provide a self-sufficient/self-adaptive control which produces an infinite disturbance rejection ratio and zero-order dynamics, the performance characteristics not previously attained.

These and other objects and advantages of the present invention will no doubt be obvious to those skilled in the art after having read the following detailed description of the preferred embodiments which are illustrated in the FIGURES of the drawing.

DETAILED DESCRIPTION

Figure 1:
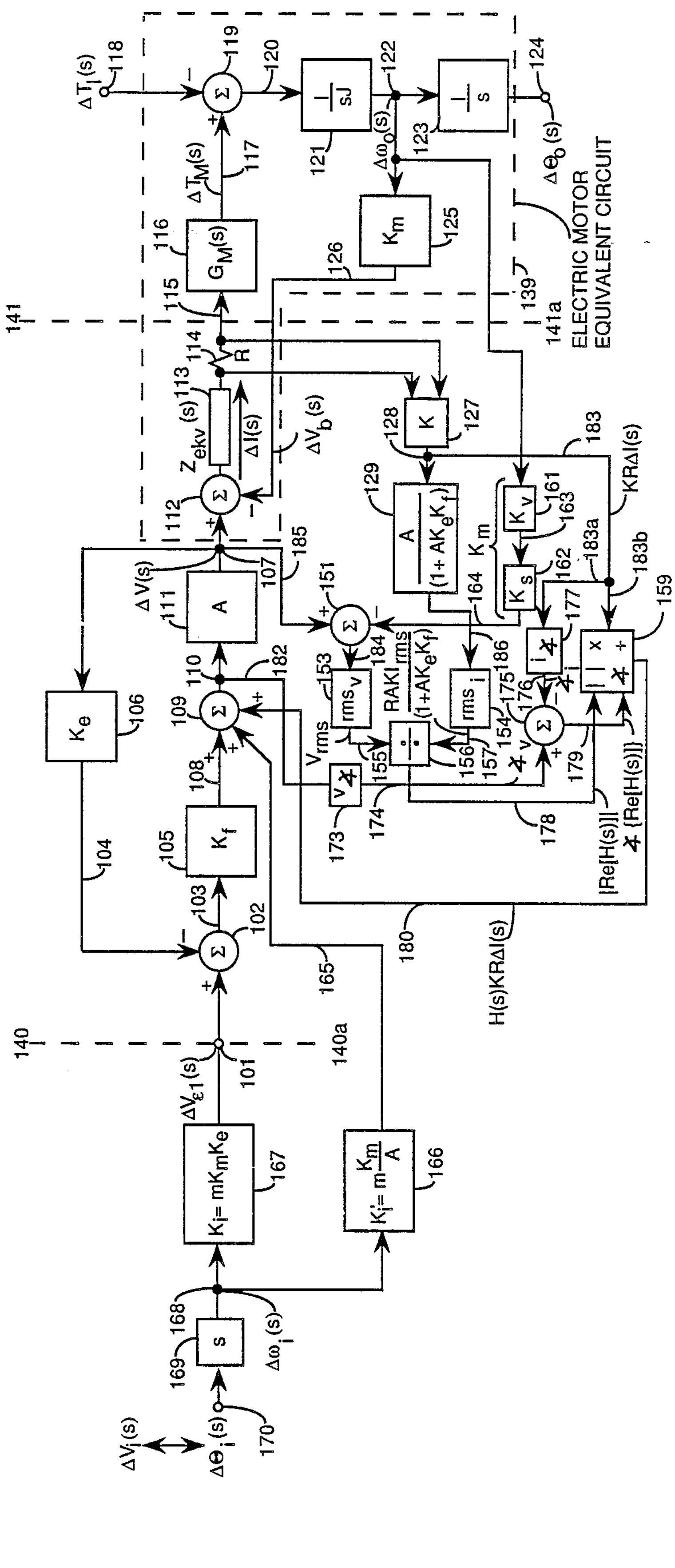
FIG. 1 is a block and schematic diagram of a first embodiment of the invention.

A parameter-free zero-impedance converter embodying the principles of the invention applied to synthesizing electric motor drive systems of infinite disturbance rejection ratio and zero-dynamics/instantaneous response and using an internal negative voltage feedback loop is shown in FIG. 1. In FIG. 1, it is assumed that input voltage $V_{in}$ (not illustrated) applied to a pulse width modulated (PWM) power stage within block 111 is constant so that a gain constant A characterizes transfer function of the PWM control and power stage 111. The power stage within block 111 is implemented appropriately for the kind of motor which is powers; for example, it may be a dc-to-dc converter for dc motors or dc-to-ac converter for ac motors or a PWM power stage employed for driving step motors (in this latter case some additional circuits may be used without affecting the embodiment). The PWM control portion within block 111 then performs appropriate control function. What is of interest is that the overall voltage gain of the control and power PWM stage 111 is a constant A. Thus, a signal applied to lead 110 is voltage-amplified A times to appear as voltage $\Delta V(s)$ on lead 107 with an associated power/current $\Delta I(s)$ supplied by the input voltage source $V_{in}$.

In FIG. 1, portion between boundaries **140–140*a* and 141–141*a*** denotes parameter-free zero-impedance converter; the remaining portion illustrates an application of such a synthesized converter in synthesizing an electric motor drive system of infinite disturbance rejection ratio and zero order dynamics/instantaneous response.

The parameter-free zero-impedance converter employs a positive current feedback loop and a negative voltage feedback loop. The positive current feedback loop incorporates a prescribed functionalism used to synthesize a current feedback transfer function H(s). The prescribed functionalism in the positive current feedback loop mathematically provides a generalized voltage and current phasors, associated with the generalized (Laplace-domain) impedance $\hat{Z}=\hat{V}/\hat{I}=V_{rms}$ $\angle_{\nu}/I_{rms}\angle_{i}$ equal to the (motor) impedance of interest 113 of value $Z_{ekv}(s)$ for continuous and real time measurements of both true rms and phase angles of both voltage and current associated with the impedance 113, in both steady state and transient. The circuit realization of the prescribed functionalism in the positive current feedback loop is based on using true rms measurements and phase measurements of a resulting voltage across the impedance of interest (113) and a current through the impedance of interest (113) in both steady state and transient, and using (arithmetic) multiplier and divider circuits as well as phase shifting circuits for both adding and subtracting phase in a continuous and real time manner to provide for the required current feedback signal on lead 180. The negative voltage feedback loop incorporates a voltage feedback circuit 106 whose transfer function is a constant $K_e$. The purpose of the positive current feedback loop is to synthesize in a parameter-free manner the zero-impedance converter with respect to a motor impedance 113 whose value $Z_{ekv}(s)$ is opposed by a negative impedance value provided by the action of the loop forcing the resulting (trans)impedance to zero for the magnitude and phase of the real part of the current feedback transfer function H(s) synthesized as given in Eqs.(1) and (3), respectively, as it will be explained shortly. The purpose of the negative voltage feedback loop is to stabilize the system in an inherent and self sufficient manner so that the converter can be used as an autonomous entity in any application.

In operation, the current $\Delta I(s)$ through an electric motor impedance 113 of value $Z_{ekv}(s)$ is sensed by a current sense device 114 whose transresistance is R. The electric motor impedance 113 is a series connection of a resistance and an inductive reactance in case of a dc, synchronous ac, and step motors. In case of asynchronous (induction) ac motor this impedance consists of a series connection of a stator impedance with a parallel connection of a magnetizing reactance and a rotor impedance referred to stator. The current, whose Laplace transform is $\Delta I(s)$, provides a motor developed torque $\Delta T_M(s)$ by means of a torque-producing mechanisms represented by a block 116 of transfer function $G_M(s)$. In case of n-phase motors, a total current $\Delta I(s)$ is understood to be on lead 115 as an input to block 116, and the parameter-free zero-impedance converter, between boundaries **140–140*a* and 141–141*a*, is assumed to be per-phase based. The Laplace-transformed function $G_M(s)$ is used to denote the torque producing mechanisms of any electric motor even though in some motors the torque production is a nonlinear process. The justification for this linearized model in block 116 is in that the function $G_M(s)$ does not play any role in functioning of the algorithm of the preferred embodiment of FIG. 1, as it will be shortly derived. The motor developed torque $\Delta T_M(s)$, available on lead 117, is opposed by a load torque $\Delta T_l(s)$, supplied by a mechanical load at point 118. This opposition takes place in an algebraic summer 119. The difference between the two torques, $\Delta T_M(s)-\Delta T_l(s)$, is supplied by lead 120 to a block 121 which denotes transformation from a torque to an angular shaft speed $\Delta\omega_0(s)$, and whose transfer function is 1/sJ, where J is a system moment of inertia. Normally, block 121 has a transfer function $1/(sJ+B)$ where B is a viscous friction coefficient. However, as it will be shown, the algorithm of the parameter-free zero-impedance converter is independent of the transfer function of block 121, whether it be expressed as 1/sJ or $1/(sJ+B)$, implying infinite robustness of the system employing the converter to the mechanical parameters. The angular shaft speed $\Delta\omega_0(s)$ is produced at point 122 while an angular shaft position $\Delta\Theta_0(s)$, obtained by integration of the speed in block 123, is available at point 124. A counter electromotive force (back emf) $\Delta V_b(s)$ is produced on lead 126 which opposes a voltage applied to the motor $\Delta V(s)$ available at point 107. This opposite is represented by subtracting the back emf from the voltage applied to the motor, an algebraic summer 112. For a constant air-gap flux in an electric motor, regardless of type of motor, the back emf is produced in proportion to the angular speed where the proportionality constant is denoted $K_m$ and is drawn as a block 125 in FIG. 1. The negative voltage feedback loop is closed through a voltage feedback circuit 106 characterized by a gain constant $K_e$ which supplies a voltage feedback signal on lead 104. The voltage feedback signal is subtracted in a summer 102 from a direct path signal $\Delta V_{\epsilon l}(s)$ supplied at point 101 which is input of the parameter-free zero-impedance converter. A voltage error signal is thus produced at the output lead 103 of the summer 102 and is passed through a forward circuit 105 of gain $K_f$. The forward circuit 105 outputs a forward control signal and supplies it to a summing circuit 109 via lead 108. The direct path signal $\Delta V_{\epsilon l}(s)$ is provided at the output of a direct path circuit 167 characterized by a gain $K_i$. The input of the direct path circuit is fed by an input velocity command $\Delta\omega_i(s)$, available at point 168, provided by differentiating an input position command $\Delta\theta_i(s)$ in differentiator 169. A position voltage command $\Delta V_i(s)$ corresponding to the input position command $\Delta\theta_i(s)$ is applied at terminal 170. The input velocity command $\Delta\omega_i(s)$ is also fed to a feedforward circuit 166 characterized by a gain $K_i'$. The output of the feedforward circuit is fed in a positive manner into the summing circuit 109 by means of a lead 165**.

The voltage representative of a motor current, $R\Delta I(s)$, is buffered by a differential amplifier 127 whose gain constant is K. The output of the isolating/buffering amplifier 127, available at point 128, is fed to a current sense gain circuit 129 characterized with a gain constant $A/(1+AK_eK_f)$, and is also brought via lead 183 to leads **183*a* and 183*b* as a buffered current sense signal whose Laplace transform is $KR\Delta I(s)$. A processed current sense signal, obtained by passing the buffered current sense signal through the current sense gain circuit 129, whose Laplace-transformed value is $\{RAK/(-1+AK_eK_f)\}\Delta I(s)$ is brought via lead 186 to a true root-mean-square (rms) current sense measuring circuit $rms_i$ referred to with numeral 154. The true rms current sense measuring circuit provides on lead 157 continuously and in real time a true rms value of the processed current sense signal in both steady state and transient of the sensed current. Such measuring circuit are based on well known (classical) principles of operation which will not be elaborated here except to say that they use a digital sampling techniques to provide a true rms measurements every microsecond, or in even shorter intervals, which, for the practical applications of the parameter-free zero-impedance converter to the electric motor drive systems can be considered a continuous information available in both steady state and transient of the sensed current, for any current waveform. The motor voltage, whose Laplace transform is $\Delta V(s)$, is sensed and a voltage sense signal is brought via lead 185 to a voltage algebraic summing circuit 151. The voltage sense signal is opposed by a sensed back emf signal in the summer 151. It should be understood that, for a pulse width modulated power stage within block 111, a pulse width modulated waveform , whose Laplace transform is $\Delta V(s)$, exists at point 107 in a form appropriate for the type of motor to which it is applied, so that the output 184 of the summer 151 provides an instantaneous resultant voltage which, effectively, represents an actual instantaneous voltage across the motor impedance 113 for the resulting gain in the sensed back emf signal path being equal to the motor back emf constant $K_m$. Therefore, the sensed back emf signal, available on lead 164, is provided by sensing the angular shaft speed $\Delta\omega_0(s)$ by a tach 161 of a gain $K_v$ in [Volt-/rad/sec] and passing the tach signal, available on lead 163, through a tach gain circuit 162 whose gain $K_s$ is chosen such that $K_sK_v=K_m$. It is implicitly assumed that the voltage algebraic summing circuit 151 is implemented in such a way as to have its output, lead 184, blank out (zero) for off times of the PWM waveform $\Delta V(s)$ while during on time of the PWM waveform the summer 151 always performs subtraction of the two signals by opposing the signal on lead 164 to the signal on lead 185 The instantaneous resultant voltage, available on lead 184, is applied to a true rms voltage sense measuring circuit $rms_v$ referred with numeral 153. The true rms voltage sense measuring circuit provides on lead 155 continuously and in real time a true rms value of the instantaneous resultant voltage in both steady state and transient of the sensed voltage. Again, as in connection with the true rms current sense measuring circuit $rms_i$, the true rms voltage sense measuring circuit $rms_v$ is based on the classical principles of operation for obtaining a true rms value of a waveform, which will not be elaborated here, and, in fact, is identical to the circuit $rms_i$. (Both true rms measuring circuits actually operate on voltages i.e , provide true rms values of a voltage signals, since the processed current sense signal is in a voltage form, too). The true rms value of the instantaneous resultant voltage, available on lead 155, is divided in an arithmetic divider circuit 156 with the true rms value of the processed current signal, available on lead 157, to produce a magnitude of a real part of a current feedback transfer function H(s) in both steady state and transient of the sensed voltage and sensed current, and for any voltage and current waveform, on lead 178. The buffered current sense signal, available on lead 183***a*, is fed to a current phase measuring circuit $i_{\measuredangle}$ referred to with numeral 177. The current phase measuring circuit provides one lead 176 continuously and in real time a buffered current sense signal phase in both steady state and transient of the sensed current. Similarly as in connection with the true rms measuring circuits, the current phase measuring circuit is based on well known (classical) principles of operation which will not be elaborated here except to say that a digitally-based phase meters can provide the phase measurements every microsecond, or in even shorter intervals, which, for the practical applications of the parameter-free zero-impedance converter to the electric motor drive systems, can be considered a continuous information available in both steady state and transient of the sensed current, for any current waveform. A resulting total control signal, available on lead 110, is brought via lead 182 to a voltage phase measuring circuit $v_{\measuredangle}$ referred to with numeral 173. The voltage phase measuring circuit provides on lea 174 continuously and in real time a resulting total control signal phase in both steady state and transient of the resulting total control signal. It should be understood that, for a pulse width modulated voltage waveform at point 107, the phase of the resulting total control signal at point 110, actually represents an instantaneous phase of the voltage commanded to the motor, i.e., it is equal to the instantaneous phase of an average (dc) content of the PWM waveform $\Delta V(s)$ in case of a dc motor, and it is equal to the instantaneous phase of a fundamental component of the PWM waveform in case of ac motors, and in case of a step motor it is equal to the instantaneous phase of a pulsed waveform free of the actual PWM content. Again, as in connection with the current phase measuring circuit $i_{\measuredangle}$, the voltage phase measuring circuit $v_{\measuredangle}$ is based on the classical principles of operation of a phase meter, which will not be elaborated here, and, in fact, is identical to the circuit $i_{\measuredangle}$. (Both phase measuring circuits actually operate on voltages, i.e., provide ins phases of a voltage signals, since the buffered current sense signal is in a voltage form, too). The resulting total control signal phase, available on lead 174, is brought to a phase difference circuit 175, which provides a phase of a real part of a current feedback transfer function H(s) in both steady state and transient of the sensed voltage and sensed current, and for any voltage and current waveform, on lead 179, by subtracting the buffered current sense signal phase, available on lead 176, from the resulting total control signal phase, brought to the phase difference circuit 175 via lead 174. The phase difference circuit 175 is implemented as an algebraic summer operating on a voltage representatives of the respective signal phases. The buffered current sense signal, available on lead 183*b*, is magnitude multiplied and phase shifted, continuously and in real time, by a value of the magnitude of a real part of a current feedback transfer function $|Re[H(s)]|$ and for a value of the phase of a real part of a current feedback transfer function $\measuredangle\{Re[H(s)]\}$, respectively, in a current feedback circuit 159. The current feedback circuit 159 consists of an arithmetic multiplier followed by a phase shifting circuit which, in a tandem operation, provide a processed current feedback signal on lead 180 whose both amplitude and phase are controlled continuously and in real time and for both transient and steady state. The arithmetic multiplier circuit as well as the phase shifting circuit within the current feedback circuit 159 are standard circuit blocks and will not be elaborated here. The processed current feedback signal obtained in the described way is then added in the positive feedback manner via lead 180 to the forward control signal, available on lead 108, and to a feedforward signal, available on lead 165, in a summing circuit 109 providing the resulting total control signal on lead 110. The resulting total control signal is applied via lead 110 to the PWM control and power stage 111 where it is voltage amplified A times appearing as voltage ΔV(s) at point 107 which, opposed by the back emf voltage $\Delta V_b(s)$ inherently generated within a motor on lead 126, creates motor current ΔI(s) through the motor equivalent impedance $Z_{ekv}(s)$.

The implementation of the PWM control and power stage 111 is irrelevant for the functioning of the embodiment of FIG. 1, as discussed earlier. It is only the voltage gain A of block 111 which is involved in the algorithms of the embodiment. It is understood that signals associated with the summing circuit 109, i.e., signals on leads 108, 165, 180, and 110 are compatible in that they are: a dc varying signal in case of a dc motor; a sinusoidal signals of the same frequency in case of ac motors; and a pulse signals of the same rate in case of a step motor (which produces an angular shaft speed $\Delta\omega_0(s)$ proportional to this rate of pulses). Also the signals associated with the summer 102, i.e., signals on leads 101, 104, and 103 are a dc varying signals in case of a dc motor; a sinusoidal signals of the same frequency in case of ac motors; and a pulse signals of the same rate in case of a step motor. Thus, for a pulse width modulated power stage within block 111, it is assumed that an average (dc) varying signal, filtered from the actual PWM waveform ΔV(s), is fed back through block 106 in the negative voltage feedback loop in case of a dc motor; a fundamental ac waveform and a pulsed waveform filtered from the actual PWM waveform ΔV(s) are fed back through block 106 in the negative voltage feedback loop for cases of ac and step motors, respectively. This lowpass filtering is assumed prior to feeding block 106 and is not explicitly shown in FIG. 1. In the same sense, a velocity command voltage corresponding to the input velocity command $\Delta\omega_i(s)$, applied to the input of the direct path circuit 167 and to the input of the feedforward circuit 166, is a dc varying voltage in case of a dc motor; a sinusoidal voltage of frequency equal to the fundamental component of the PWM voltage ΔV(s) in case of an ac motor; and a pulse voltage at the rate of pulses equal to the rate of pulses proportional to which a step motor develops its angular shaft speed $\Delta\omega_0(s)$, in case of step motors.

The scaling factor m in blocks 167 and 166 has units in [radian/Volt] for the position voltage command $\Delta V_i(s)$ applied to terminal 170, i.e., for the correspondence $\Delta V_i(s) \longleftrightarrow \Delta\theta_i(s)$. In case of the velocity command voltage, corresponding to the input velocity command $\Delta\omega_i(s)$, applied to point 168, the scaling factor has units in [radian/second/Volt]. Due to the differentiator operator s in block 169, the effective dimensioning associated with blocks 167 and 166 is identical with regards to the dimension for m and is equal to [rad/sec/Volt]. The back emf constant in blocks 125, 167, and 166, and associated with the overall gain constant of blocks 161 and 162, has units in [Volt/rad/sec[. Since the voltage-gain blocks 106 and 111, characterized by constants $K_e$ and A, respectively, are dimensionless, it follows that blocks 167 and 166, characterized by a transfer functions that will shortly be derived and which are shown in the embodiment of FIG. 1 as $K_i 32\ mK_mK_e$ and $K_i' = mK_m/A$, are also dimensionless, representing voltage-gain circuits. The overall transfer function of blocks 161 and 162, being dimensioned in [Volt/rad/sec], is actually dimensioned in units of the tach gain constant $K_v$[Volt/rad/sec] so that the gain constant $K_s$ of block 162 is dimensionless. Also dimensionless are gains of blocks 105 and 127, having values of $K_f$ and K, respectively. The current feedback circuit 159, which performs magnitude multiplication and phase shifting of the buffered current sense signal KRΔI(s), can be considered characterized by a transfer function that will shortly be derived as H(s) whose magnitude and phase angle are shown in Eqs.(1) and (3) in the summary of the invention, for physical real time domain.

The portion in FIG. 1 within broken line, referred to with numeral 139, represents an electric motor equivalent circuit where, as explained earlier, $G_M(s)$ denotes a torque production mechanisms on the basis of a current supplied to the motor, and $K_m$ denotes a back emf production mechanisms which, for constant air-gap flux, produce a voltage proportional to the angular shaft speed to oppose the voltage supplied to the motor, ΔV(s). It should be understood that the back emf results into a reduced dc voltage applied to the motor impedance $Z_{ekv}(s)$ in case of a dc motor, and, in cases of ac and step motors, it reduces a peak-to-peak, and thus rms, voltage applied to the motor impedance $Z_{ekv}(s)$.

Assuming that, mathematically and in a complex domain s, the processed current feedback signal on lead 180 is obtained by multiplying the Laplace-transformed buffered current sense signal KRΔI(s) with the complex transfer function H(s), i.e., that the Laplace-transformed processed current feedback signal on lead 180 is equal to H(s)KRΔI(s), the transadmittance of parameter-free zero-impedance converter of FIG. 1, for $R << |Z_{ekv}(s)|$ and in complex frequency (s) domain is $$\Delta I(s)/\Delta V_{68}\ 1(s) = AK_f/\{[Z_{ekv}(s)[1+AK_eK_f] - H(s)RAK] + [-1+AK_eK_f][K_m(1/sJ)G_M(s)]\} \quad (9)$$

The transfer function of the embodiment of FIG. 1, naturally defined for the complex frequency (s) domain, is $$\Delta\theta_0(s)/\Delta\theta_i(s) = [T_1'(s) = T_4'(s)]/[T_1(s) = T_2(s) + T_4(s)] \quad (10)$$

where $$T_1'(s) = G_M(s)K_fAsK_i \quad (11)$$

$$T_4'(s) = G_M(s)AsK_i' \quad (12)$$

$$T_1(s) = G_M(s)K_fAsK_mK_e \quad (13)$$

$$T_2(s) = s^2JT_3(s) \quad (14)$$

$$T_3(s) = Z_{ekv}(s)[1+AK_eK_f] - H(s)RAK \quad (15)$$

$$T_4(s) = G_M(s)sK_m \quad (16)$$

A transfer function from the input of the converter (point 101) to the angular shaft speed (point 122) is $$\Delta\omega_0(s)/\Delta V_{\omega 1}(s)=\{AK_f/[Z_{ekv}(s)[1+AK_eK_f]]\}//\{[K_m/Z_{ekv}(s)]+[sJ/G_M(s)][1-[H(s)RAK/Z_{ekv}(s)(1+AK_eK_f)]]\} \quad (17)$$

The dynamic stiffness of the system of FIG. 1, for $R<<|Z_{ekv}(s)|$, is $$-\Delta T_l(s)/\Delta\theta_0(s)=[T_1(s)+T_2(s)+T_4(s)]/T_3(s) \quad (18)$$

Denoting a part of the output angular shaft position response due to the input position command in Eq.(10) $\Delta\theta_{0i}(s)$, and a part of the output angular shaft position response due to the load torque disturbance in Eq.(18) $\Delta\theta_{0l}(s)$, the disturbance rejection ratio of the embodiment of FIG. 1 is $$D_{rr}(s)=\Delta\theta_{0i}(s)/\Delta\theta_{0l}(s)=\{]T_1'(s)=T_4'(s)]\Delta\theta_i(s)\}/\{T_3(s)[-\Delta T_l(s)]\} \quad (19)$$

Substituting Eq.(15) in Eq.(19) it is seen that the embodiment of FIG. 1 becomes of infinite disturbance rejection ratio for the complex transfer function, characterizing in the complex frequency domain block 159, H(s) as given below $$H(s)=Z_{ekv}(s)/\{RAK/[1+AK_eK_f]\} \quad (20)$$

Therefore, for the condition in Eq (20), Eq.(19) becomes $$D_{rr}(s)=\infty \quad (21)$$

The condition for the infinite disturbance rejection ratio, as given in Eq.(20) is equivalent to producing an infinite transadmittance part in series with a finite transadmittance part, as seen by substituting Eq.(20) in Eq.(9), yielding the resulting transadmittance being equal to the finite transadmittance part $$\Delta I(s)\Delta V_{\epsilon 1}(s)=AK_f/\{[1+AK_eK_f][K_m(1/sJ)G_M(s)]\} \quad (22)$$

The infinite disturbance rejection ratio property, Eq.(21), is equivalent also to a load independence of the embodiment of FIG. 1, as seen by substituting Eq.(20) in Eq.(18).

Further, the algorithm for the infinite disturbance rejection ratio, as given in Eq.(20), reduces transfer function of Eq.(17) to a real number independent of time constants associated with the complex impedance $Z_{ekv}(s)$ and of mechanical parameters such as system moment of inertia J. Substituting Eq.(20) in Eq.(17)

$$\Delta\omega_0(s)/\Delta V_{\epsilon 1}(s)=AK_f/[K_m(1+AK_eK_f)] \quad (23)$$

Eq.(23) implies that all electrical and mechanical time constants in the system in FIG. 1 have been brought to zero while keeping finite gain(s)! The algorithm of Eq.(20) also reduces the order of the system transfer function as shown next. In a general case, the forward circuit 105 can be characterized by a complex transfer function $G_R'(s)$. Replacing constant $K_f$ with transfer function $G_R'(s)$ and substituting Eq.(20) in Eq.(10) the system transfer function becomes $$\Delta\theta_0(s)/\Delta\theta_i(s)=[G_R'(s)K_i+K_i']/[G_R'(s)K_mK_e+(K_m/A)] \quad (24)$$

The transfer function in Eq.(24) is of a reduced order as compared to the function in Eq.(10) and can be further brought to a zero order, i.e., to a constant m, for direct path circuit 167 and feedforward circuit 166 synthesized to provide constant gains as given in Eqs.(4) and (5) and repeated here $$K_i=mK_mK_e \quad (25)$$

$$K_i'=mK_m/A \quad (26)$$

Thus, for the algorithms of Eqs.(20), (25), and (26), the system transfer function becomes $$\Delta\theta_0(s)/\Delta\theta_i(s)=m \quad (27)$$

In order to synthesize the algorithm in Eq.(20) in a parameter-free manner, i.e., without having to know values of both resistive and reactive components within the impedance of interest $Z_{ekv}(s)$, it is to be realized that the (Laplace) complex valued impedance, which is impedance $Z_{ekv}(s)$, is a dynamic impedance in terms of that it contains both transient and steady state parts. Therefore, in order to synthesize in real time impedance $Z_{ekv}(s)$ one has to provide real time measurements of true rms voltage and current associated with the impedance $Z_{ekv}(s)$ in both transient and steady state, as well as measurements of phase displacement between the voltage and the current in both transient and steady state, as the (dynamic) impedance $Z_{ekv}(s)$ can then be expressed as a ratio of the true rms's of voltage and current in its magnitude part, and as a phase difference between the voltage and the current in its phase part. However, a physical measurements are made in the time domain with the physically existing time functions, such as voltage and current, and these physically existing time functions are obtained as a real parts of a complex-valued functions (a complex function cannot be provided in a lab, but only its real part can). Therefore, a real part of the complex-valued function H(s), consisting of magnitude and phase term, is provided by real time continuous measurements of true rms of voltage and current and of phase displacement between the two waveforms, and incorporating the appropriate elements as discussed in connection with FIG. 1. Such a synthesized real part of the complex-valued function H(s) is physical representation of that function in both steady state and transient because the measurements, on which it is based, are taken continuously and in real time in both steady state and transient.

An alternative system approach of finding an impulse response h(t) from complex transfer function H(s) and then convolving a signal of interest, in this case the buffered current sense signal KRΔi(t), with the h(t) in order to obtain the desire output, in this case the processed current feedback signal on lead 180, directly in time domain, would not provide a desired result because it does not have physic meaning because an inverse Laplace transform of $Z_{ekv}(s)$, which is in H(s) as seen from Eq.(20), does not have physical meaning.

Therefore, for real time continuous measurements as explained in connection with FIG. 1, the algorithm in Eq.(20) reduces to multiplying the instantaneous value of the buffered current sense signal KRΔi(t) with a magnitude of the real part of the transfer function H(s), i.e., with |Re[H(s)]|, and shifting the instantaneous phase of the buffered current sense signal KRΔi(t) for a phase of the real part of the transfer function H(s), i.e., for $\measuredangle$\{Re[H(s)]\}, where |Re[H(s)]| and $\measuredangle$\{Re[H(s)]\} are given in Eqs.(1) and (3), respectively, and repeated here $$|Re[H(s)]| = V_{rms}/[RAKI_{rms}/(1+AK_eK_f)] \quad (28)$$

$$\sphericalangle\{Re[H(s)]\} = \sphericalangle_v \sphericalangle_i \quad (29)$$

where $V_{rms}$ is a true rms of a resulting voltage across the impedance of interest; with reference to FIG. 1 the impedance of interest is an electric motor equivalent impedance $Z_{ekv}(s)$, and the resulting voltage across the $Z_{ekv}(s)$ is due to the voltage applied to the motor and opposed by a back emf, $I_{rms}$ is a true rms of a current through the impedance of interest, $\sphericalangle_v$ is an instantaneous phase of the resulting voltage across the impedance of interest, and $\sphericalangle_i$ is an instantaneous phase of the current through the impedance of interest.

The remaining parameters in Eq.(28) were described earlier.

With reference to FIG. 1, Eqs.(22), (23), and (27) imply that the parameter-free zero-impedance converter, in addition to having eliminated all time constants associated with an electric motor impedance $Z_{ekv}(s)$ (and thus effectively forced the impedance to zero), also eliminated any dependence on a torque producing mechanisms, denoted by $G_M(s)$, and provided an infinite robustness of the embodiment of FIG. 1 with respect to the system moment of inertia J. The infinite transadmittance part of the parameter-free zero-impedance converter should be interpreted as a zero transimpedance part of the converter and, with reference to FIG. 1, as forcing the direct path signal $\Delta V_{\epsilon 1}(s)$ applied to the input of the converter not to change while maintaining a finite and instantaneous current change $\Delta I(s)$ through the impedance interest $Z_{ekv}(s)$, which is nulled out by a negative impedance term $\{RAK/(-1+AK_eK_f)\}$. $\{V_{rms}$ $_v/[RAKI_{rms}$ $_i$ $(1+AK_eK_f)]\}$. Since the direct path signal voltage applied to converter input $\Delta V_{\epsilon 1}(s)$ is a command voltage it follows that by forcing the change of this voltage to zero no corrective change of a command is needed to preserve the same value of the output variables of interest: angular shaft speed $\Delta\omega_0(s)$ and position $\Delta\theta_0(s)$, in case in which this corrective change would normally be required due to finite impedance $Z_{ekv}(s)$ in an effectively open-loop system with respect to the output variables under control: $\Delta\omega_0(s)$ and $\Delta\theta_0(s)$. It is seen from Eq.(18) that the change of the command voltage signal is normally required in open-loop systems due to a finite impedance $Z_{ekv}(s)$ when load torque changes. Thus, the converter with its property of the infinite transadmittance portion, i.e., with its ability to force the impedance of interest to zero, implies no need for change of the command voltage signal in the open-loop system for case of load changes, yielding an infinite disturbance rejection ratio in both transient and steady state for the true rms values $V_{rms}$ and $I_{rms}$ and the instantaneous phases $\sphericalangle_v$ and $\sphericalangle_i$ of voltage and current associated with the impedance of interest $Z_{ekv}(s)$ being measured continuously and in real time in both steady state and transient.

Since the electric motor drive systems are in general a control systems designed to follow an input position or velocity command and to do that in pressence of load changes, it follows that both of these tasks are done in a most ultimate way by synthesizing the system according to the preferred embodiment of FIG. 1 without using position and velocity feedback loops, i.e., controlling the system in an effectively open-loop mode with respect to the variables under the control, shaft speed and position, and with any kind of motor including dc, synchronous and asynchronous ac, and step motors, and without need to know parameters of the motor impedance as the impedance is being continuously synthesized from the real time measurements of voltage and current associated with the impedance so that the embodiment of FIG. 1 operates in a self-governing way.

With regards to a circuit realization of the prescribed functionalism in the positive current feedback loop it consists of standard measuring circuits: true rms meters and phase meters, standard arithmetic circuits: dividers, multipliers and algebraic summers, and phase shifter. The principles of operation of each of these circuits are well established and are not discussed here except to say that, due to the relative complexity of the prescribed functionalism, a digital/software implementation may be preferred to realize the positive current feedback loop, according to the description of the embodiment as provided in connection with FIG. 1. Sampling frequencies in a MHz range can be used to provide practically continuous true rms and phase measurements in both steady state and transient and, for the embodiment of FIG. 1 representing an application of the parameter-free zero-impedance converter to the pulse width modulated electric motor drive systems, the digitally obtained and processed measurements appear as continuous signals with respect to the pulse width modulation switching/carrier frequency which is rarely over 100 kHz and most often from few kHz to several tens of kHz.

Figure 2:
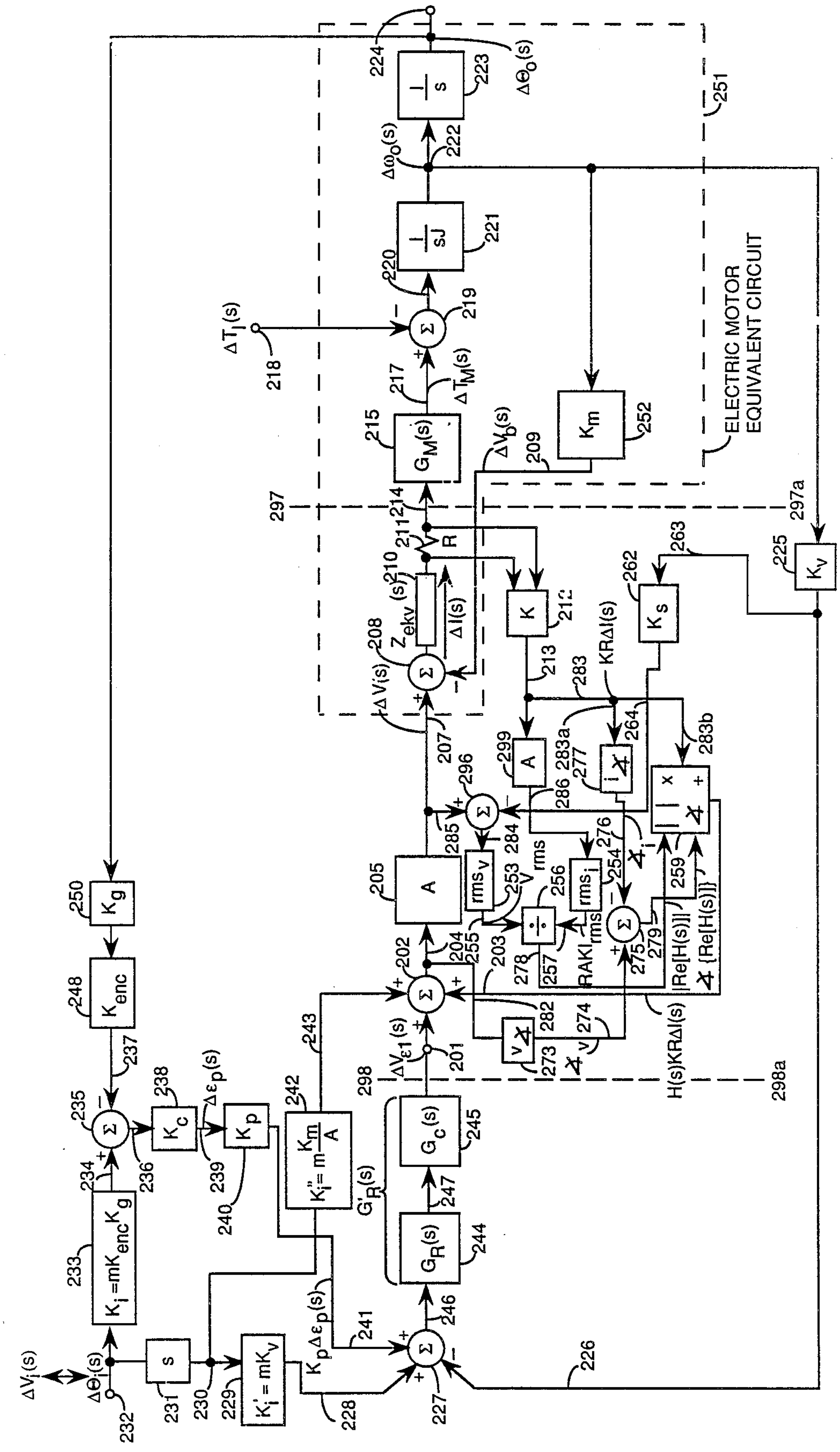
FIG. 2 is a block and schematic diagram of another embodiment of the invention.

FIG. 2 shows a parameter-free zero-impedance converter embodying the principles of another embodiment of invention applied to synthesizing electric motor drive systems of infinite disturbance rejection ratio and zero order dynamics and using both position and velocity feedback loops. The use of the two loops may be preferred in order to avoid filtering of a pulse width modulated voltage applied to the motor when this voltage is used to close an internal negative voltage feedback loop as in case of FIG. 1. It should be stated that it is not necessary to close both position and velocity feedback loop in the embodiment in FIG. 2: closing any of the two loops would still provide for the properties of infinite disturbance rejection ratio and zero order dynamics in the embodiment of FIG. 2, but it was chosen to present the embodiment in FIG. 2 with both position and velocity feedback loops closed for generality purposes. From such a general scheme it is easily shown that by having only one of the two loops still provides for the properties of infinite disturbance rejection ratio and zero order dynamics It is, however, preferred in such a case to close the velocity negative feedback loop because a tach is use already for the purposes of providing necessary information (about back emf) to a circuitry within a current loop.

In FIG. 2, it is assumed that input voltage $V_{in}$ (not illustrated) applied to a pulse width modulated (PWM) power stage within block 205 is constant so that a gain constant A characterizes transfer function of the PWM control and power stage 205. The power stage within block 205 is implemented appropriately for the kind of motor which it powers; for example, it may be a dc-to-dc converter for dc motors or dc-to-ac converter for ac motors or a PWM power stage employed for driving step motors (in this latter case some additional circuits may be used without affecting the properties of the embodiment). The PWM control portion within block 205 then performs appropriate control function. What is of interest is that the overall voltage gain of the control and power PWM stage 205 is a constant A. Thus, a signal applied to lead 204 is voltage-amplified A times to appear as voltage ΔV(s) on lead 207 with an associated power/current ΔI(s) supplied by the input voltage source $V_{in}$.

In FIG. 2, portion between boundaries 298–298*a* and 297–297*a* denotes parameter-free zero-impedance converter; the remaining portion illustrates an application of such a synthesized converter in synthesizing an electric motor drive system of infinite disturbance rejection ratio and zero order dynamics/instantaneous response. The parameter-free zero-impedance converter employs a positive current feedback loop within negative position and velocity feedback loops. The positive current feedback loop incorporates a prescribed functionalism used to synthesize a current feedback transfer function H(s). The prescribed functionalism in the positive current feedback loop mathematically provides a generalized voltage and current phasors, associated with the generalized (Laplace-domain) impedance $\hat{Z}=\hat{V}/\hat{I}=V_{rms}\angle\phi_v/I_{rms}\angle\phi_i$ equal to the (motor) impedance of interest 210 of value $Z_{ekv}(s)$ for continuous and real time measurements of both true rms and phase angles of both voltage and current associated with the impedance 210, in both steady state and transient. The circuit realization of the prescribed functionalism in the positive current feedback loop is based on using true rms measurements and phase measurement of a resulting voltage across the impedance of interest (210) and a current through the impedance of interest (210) in both steady state and transient, and using arithmetic circuits such as multiplier, divider, and algebraic summer circuit as well as a phase shifting circuit to perform the necessary measurements and arithmetic functions in a continuous and real time manner providing for the required current feedback signal on lead 203. The negative position and velocity feedback loops incorporate a digital encoder 248 of gain $K_{enc}$[pulses/rad] and a tach 225 of gain $K_v$[Volt/rad/sec], respectively. The purpose of the positive current feedback loop is to synthesize in a parameter-free manner the zero-impedance converter with respect to a motor impedance 210 whose value $Z_{ekv}(s)$ is opposed by a negative impedance value provided by the action of the loop forcing the resulting (trans)impedance to zero for the magnitude and phase of the real part of the current feedback transfer function H(s) synthesized as given in Eqs.(2) and (3), respectively, as it will be explained shortly. The purpose of negative velocity and position feedback loops is to stabilize the system and control its dynamics by means of a stabilizing network 244 and a control block 245. In addition to eliminating a need for filtering of the PWM voltage applied to the motor ΔV(s), necessary when this voltage is used to provide a negative feedback (as in FIG. 1) as discussed previously, the position and velocity feedback loops further provide a benefit of independence of the algorithms of the embodiment, given in Eqs.(2), (3), (6), (7), and (8), of a combined transfer function of the circuits located in the forward path of the system i.e., of the circuits 244 and 245 whose individual transfer functions are $G_R(s)$ a $G_c(s)$, respectively, and combined transfer function is $G_R'(s)$.

The control function in direct path with respect to the position feedback loop incorporates a position direct path circuit 233 of a constant gain $K_i$. The control function in direct path with respect to the velocity feedback loop incorporates a velocity direct path circuit 229 of a constant gain $K_i'$. Also, the control function in the feedforward path incorporates a feedforward circuit 242 of a constant gain $K_i''$. The purpose of these three control functions is to, together with the positive current feedback loop, bring the system transfer function to a zero-order one, i.e., to a constant m, which they do for the gains $K_i$, $K_i'$, and $K_i''$ synthesized as given in Eqs.(6), (7), and (8), respectively, thereby providing a zero order dynamics with associated instantaneous response to input command.

In operation, the current ΔI(s) through an electric motor impedance 210 of value $Z_{ekv}(s)$ is sensed by a current sense device 211 whose transresistance is R. The electric motor impedance 210 is a series connection of a resistance and an inductive reactance in case of a dc, synchronous ac, and step motors. In case of asynchronous (induction) ac motor this impedance consists of a series connection of a stator impedance with a parallel connection of a magnetizing reactance and a rotor impedance referred to stator. The current, whose Laplace transform is ΔI(s), provides a motor developed torque $\Delta T_M(s)$ by means of a torque producing mechanisms represented by a block 215 of transfer function $G_M(s)$. In case of n-phase motors, a total current ΔI(s) is understood to be on lead 214 as an input to block 215, and the parameter-free zero-impedance converter, between boundaries 298–298*a* and 297–297*a*, is assumed to be per-phase based. As it will be shown, the algorithms of the embodiment in FIG. 2 are independent of the torque producing mechanisms so that these mechanisms were represented by the (linear) Laplace-transformed function $G_M(s)$ even though in some motors these mechanisms are nonlinear. The motor developed torque $\Delta T_M(s)$, available on lead 217, is opposed by a load torque $\Delta T_l(s)$, supplied externally at point 218. This opposition takes place in an algebraic summer 219. The difference between the two torques, $\Delta T_M(s)-\Delta T_l(s)$, is supplied by lead 220 to a block 221 which denotes transformation from a torque to an angular shaft speed, and whose transfer function is 1/sJ, where J is a system moment of inertia. Normally, block 221 has a transfer function 1/(sJ+B) where B is a viscous friction coefficient. However, as it will be shown , the algorithms of the embodiment of FIG. 2 given previously in Eqs.(2), (3), (6), (7), and (8), are independent of the transfer function of block 221, whether it be expressed as 1/sJ or 1/(sJ+B), implying infinite robustness of the system to the mechanical parameters. An angular shaft speed $\Delta\omega_0(s)$ is produced at point 222 while an angular shaft position $\Delta\theta_0(s)$ is produced, integrating the speed in block 223, at point 224. A counter (back) emf $\Delta V_b(s)$ is produced on lead 209 opposing voltage applied to the motor ΔV(s), available at point 207. This opposition is represented by subtracting the back emf from the voltage applied to the motor in an algebraic summer 208. As discussed in connection with FIG. 1, the back emf is produced in proportion to the angular speed, where the constant of proportionality is a constant $K_m$ (denoted in block 252), for a constant air-gap flux in an electric motor, regardless of the type of motor. The portion within broken line in FIG. 2, referred to with numeral 251, represents an electric motor equivalent circuit where $G_M(s)$ denotes a torque production mechanisms on the basis of a total current supplied to the motor and $K_m$ denotes a back emf production mechanisms for constant air-gap flux. It should be understood that the back emf results into a reduced average (dc) voltage applied to the motor impedance $Z_{ekv}(s)$ in case of a dc motor and, in cases of ac and step motors, it reduces a peak-to-peak, and thus rms, voltage applied to the motor impedance $Z_{ekv}(s)$.

The angular shaft speed $\Delta\omega_0(s)$ and position $\Delta\theta_0(s)$ are sensed by tach 225, characterized by a gain constant $K_v$[V/rad/sec], and encoder 248, characterized by a gain constant $K_{enc}$[pulses/rad], respectively. In general, a gear box may be used in the position loop; a block 250, characterized by a gear ratio constant $K_g$, denotes a gear box in FIG. 2. The position and velocity feedback signals may alternatively be derived from a single feedback sensing device by appropriate integration/differentiation, without changing the principles of operation of the embodiment. The angular shaft speed $\Delta\omega_0(s)$ is sensed by tach 225 and a velocity feedback signal is applied by lead 226 to a summer 227 to close the negative feedback loop. The velocity command voltage, obtained by differentiating and multiplying by constant $K_i'$ the position command $\Delta\theta_i(s)$, is applied by lead 228 to the summer 227. The differentiation of the position command $\Delta\theta_i(s)$ is performed in a block 231 while a velocity direct path circuit 229 multiplies the velocity signal voltage, available at point 230, to provide the velocity command voltage on lead 228. The position command $\Delta\theta_i(s)$ applied at point 232 is processed by a position direct path circuit 233 of a constant gain transfer function $K_i$ and applied to an algebraic summer 235 by means of lead 234. The signal on lead 234 is in a form of pulses whose number corresponds to the commanded angular shaft position. In that sense, the velocity signal voltage at point 230 corresponds to the rate of the position command pulses. The algebraic summer 235 is used to functionally represent a digital counter within a phase/frequency detector which counts in opposite directions position feedback pulses supplied by lead 237 and position command pulses supplied by lead 234 into counter. A number of pulses corresponding to the position error is supplied by lead 236 to a D/A converter 238 whose gain is $K_c$[V/pulses] and whose output 239 provide the position error $\Delta\epsilon_p(s)$ in an analog form. A block 240, characterized by a costant $K_p$, represents a gain constant in the position loop so that a position error voltage $K_p\Delta\epsilon_p(s)$ is provided at the output of block 240 and supplied by means of lead 241 the algebraic summer 227. The algebraic summer 227 adds the velocity command voltage, available on lead 228, in a positive manner to the position error voltage available on lead 241, and subtracts from this sum the velocity feedback signal, available on lead 226. Thus, at the output of the algebraic summer 227 a resulting error voltage is available and is brought by means of lead 246 to a stabilizing network 244 characterized by transfer function $G_R(s)$. The output of the stabilizing circuit is applied by lead 247 to a control circuit 245 characterized by transfer function $G_c(s)$. The control circuit 245 produces at its output 201 a control signal $\Delta V_{\epsilon 1}(s)$. The control signal $\Delta V_{68\ 1}(s)$ is added in a positive manner to a feedforward signal, available on lead 243, in a summer 202. The feedforward signal on lead 243 is available at the output of a feedforward circuit 242 characterized by a gain constant $K_i''$ which is fed at its input by the velocity signal voltage, available at point 230. It should be understood that the feedforward signal increases a dc voltage applied to the motor impedance $Z_{ekv}(s)$ in case of a dc motor, and in cases of ac and step motors it increases a peak-to-peak, and thus rms, voltage applied to the motor impedance $Z_{ekv}(s)$, i.e., the feedforward signal opposes action of the back emf $\Delta V_b(s)$.

The voltage representative of a motor current, $R\Delta I(s)$, is buffered by a differential amplifier 212 whose gain constant is K. The output of the isolating/buffering amplifier 212, available on lead 213, is fed to current sense gain circuit 299 characterized with a gain constant A, and is also brought via lead 283 to leads 283a and 283b as a buffered current sense signal whose Laplace transform is $KR\Delta I(s)$. A processed current sense signal, obtained by passing the buffered current sense signal through the current sense gain circuit 299, whose Laplace-transformed value is $RAK\Delta I(s)$ is brought via lead 286 to a true root-mean-square (rms) current sense measuring circuit $rms_i$ referred to with numeral 254. The true rms current sense measuring circuit provides on lead 257 continuously and in real time a true rms value of the processed current sense signal in both steady state and transient of the sensed current. Again, as in connection with describing the same block (154) of FIG. 1, such measuring circuits are based on well established and classical principles of operation which will not be elaborated here except to say that they in their digital implementation which may be preferred here, use a digital sampling techniques to provide true rms measurements during time intervals in the order of a microsecond or less, which, for the practical applications of the parameter-free zero-impedance converter to the pulse width modulated electric motor drive systems, can be considered a continuous information available in both steady state and transient of the sensed current, for any current waveform, when compared to a much lower switching/carrier pulse width modulation frequency. The motor voltage, whose Laplace transform is $\Delta V(s)$, is sensed and a voltage sense signal is brought via lead 285 to a voltage algebraic summing circuit 296. The voltage sense signal is opposed by a sensed back emf signal in the summer 296. It should be understood that, for a pulse width modulated power stage within block 205, a pulse width modulated waveform, whose Laplace transform is $\Delta V(s)$, exists on lead 207 in a form appropriate for the type of motor to which it is applied, so that the output 284 of the summer 296 provides an instantaneous resultant voltage which, effectively represents an actual instantaneous voltage across the motor impedance 210 for the resulting gain in the sensed back emf signal path being equal to the motor back emf constant $K_m$. Therefore, the sensed back emf signal, available on lead 264, is provided by sensing the angular shaft speed $\Delta\omega_0(s)$ by a tach 225 of a gain $K_v$ in [Volt/rad/sec] and passing the tach signal, available on lead 263, through a tach gain circuit 262 whose gain $K_s$ is chosen such that $K_sK_v=K_m$. It is implicitly assumed that the voltage algebraic summing circuit 296 is implemented in such a way as to have its output, lead 284, blank out (zero) for off times of the PWM waveform $\Delta V(s)$ while during on times of the PWM waveform the summer 296 always performs subtraction of the two signals by opposing the signal on lead 264 to the signal on lead 285. The instantaneous resultant voltage, available on lead 284, is applied to a true rms voltage sense measuring circuit $rms_v$ referred to with numeral 253. The true rms voltage sense measuring circuit provides on lead 255 continuously and in real time a true rms value of the instantaneous resultant voltage in both steady state and transient of the sensed voltage. Again, as in connection with the true rms current sense measuring circuit $rms_i$, the true rms voltage sense measuring circuit rms is based on the classical principles of operation for obtaining a true $rms_v$ value of a waveform, which will not be elaborated here, and, in fact, is identical in terms of the principles of operation to the circuit $rms_i$. (Both true rms measuring circuits actually operate on voltages, i.e., provide true rms values of a voltage signals, since the processed current sense signal is in a voltage form, too). The true rms value of the instantaneous resultant voltage, available on lead 255, is continuously divided in an arithmetic divider circuit 256 with the true rms value of the processed current signal, available on lead 257, to produce a magnitude of real part of a current feedback transfer function H(s) in both steady state and transient of the sensed voltage and sensed current, and for any voltage and current waveform, on lead 278. The buffered current sense signal, available on lead **283*a*, is fed to a current phase measuring circuit < referred to with numeral 277. The current phase measuring circuit provides on lead 276 continuously and in real time a buffered current sense signal phase in both steady state and transient of the sensed current. Similarly as in connection with the true rms measuring circuits, the current phase measuring circuit is based on well known (classical) principles of operation which will not be elaborated here except to say that a digitally-based phase meters, which may be preferred here, use a digital sampling techniques to provide phase measurements during time intervals in the order of a microsecond or less, which, for the practical applications of the parameter-free zero-impedance converter to the pulse width modulated electric motor drive systems, can be considered a continuous information available in both steady state and transient of the sensed current, for any current waveform, when compared to a much lower switching/carried pulse width modulation frequency. A resulting total control signal, available at point 204, is brought via lead 282 to a voltage phase measuring circuit $v_{\measuredangle}$ referred to with numeral 273. The voltage phase measuring circuit provides on lead 274 continuously and in real time a resulting total control signal phase in both steady state and transient of the resulting total control signal. It should be understood that, for a pulse width modulated voltage waveform on lead 207, the phase of the resulting total control signal, at point 204, actually represents an instantaneous phase of the voltage commanded to the motor, i.e., it is equal to the instantaneous phase of an average (dc) content of the PWM waveform ΔV(s) in case of a dc motor, and it is equal to the instantaneous phase of a fundamental component of the PWM waveform in case of ac motors, and in case of a step motor it is equal to the instantaneous phase of a pulsed waveform free from the actual PWM content. Again, as in connection with the current phase measuring circuit $i_{\measuredangle}$, the voltage phase measuring circuit $v_{21}$ is based on the classical principles of operation of a phase meter, which will not be elaborated here, and, in fact, is identical to the circuit $i_{\measuredangle}$. (Both phase measuring circuits actually operate on voltages, i.e., provide instantaneous phases of a voltage signals, since the buffered current sense signal is in a voltage form, too). The resulting total control signal phase, available on lead 274, is brought to a phase difference circuit 275, which provides a phase of a real part of a current feedback transfer function H(s) in both steady state and transient of the sensed voltage and sensed current, and for any voltage and current waveform, on lead 279, by subtracting the buffered current sense signal phase, brought to the phase difference circuit 275 via lead 276, from the resulting total control signal phase, available on lead 274. The phase difference circuit 275 is implemented as an algebraic summer operating on a voltage representatives of the respective signal phases. The buffered current sense signal, available on lead 283*b*, is magnitude multiplied and phase shifted, continuously and in real time, by a value of the magnitude of a real part of a current feedback transfer function |Re[H(s)" and for a value of the phase of a real part of a current feedback transfer function $\measuredangle\{Re[H(s)]\}$, respectively, in a current feedback circuit 259. The current feedback circuit 259 consists of an arithmetic multiplier followed by a phase shifting circuit which, in a tandem operation, provide a processed current feedback signal on lead 203 whose both amplitude and phase are controlled continuously and in real time and for both transient and steady state. The arithmetic multiplier circuit as well as the phase shifting circuit within the current feedback circuit 259 are standard circuit blocks and will not be elaborated here except to say that their digital/software implementation may also be preferred. (It is implicitly assumed that any digital signal processing, i.e., digital implementation of the prescribed functionalism (circuitry), in either FIG. 1 or FIG. 2 would require use of a D/A and A/D converters in order to communicate with the analog variables on both ends of the prescribed circuitry). The processed current feedback signal obtained in the described way is then added in the positive feedback manner via lead 203 to the control signal $\Delta V_{\epsilon 1}(s)$, available on lead 201, and to the feedforward signal, available on lead 243. The addition of the three signals is done in summer 202 whose output provides a resulting total control signal which is applied via lead 204 to a pulse width modulation and power stage 205 where it is voltage amplified A times appearing as voltage ΔV(s) on lead 207 which, opposed by the back emf voltage $\Delta V_b(s)$ inherently produced within a motor on lead 209**, creates motor current ΔI(s) through the motor equivalent impedance $Z_{ekv}(s)$.

As in connection with FIG. 1, the implementation of the PWM control and power stage 205 in FIG. 2 is irrelevant for the functioning of the embodiment in FIG. 2. It is only the voltage gain A of block 205 which is involved in the algorithms of the embodiment. It is understood that signals associated with the summing circuit 202 are compatible in that they are: a dc varying signals in case of a dc motor; a sinusoidal signals of the same frequency in case of an ac motor; and a pulse signals of the same rate in case of a step motor (which produces an angular shaft speed $\Delta\omega_0(s)$ proportional to this rate of pulses). The voltage supplied to the motor ΔV(s) is in a pulse width modulated form whose average value corresponds to a voltage seen by a dc motor; its fundamental component corresponds to a sinusoidal voltage seen by an ac motor; and its pulsed waveform, free from the actual pulse width modulation, is seen by a step motor.

The scaling factor m in blocks 233, 229, and 242 has units in [radian/Volt] for a voltage command $\Delta V_i(s)$ actually representing the position command $\Delta\theta_i(s)$ in response to which an angular shaft position $\Delta\theta_0(s)$ is reached, i.e., $\Delta V_i(s) \longleftrightarrow \Delta\theta_i(s)$, and, as it will be shown shortly for the embodiment in FIG. 2, a zero order transfer function is provided, i.e., $\Delta\theta_0(s)/\Delta\theta_i(s)=m$. As previously indicated, gain constant $K_v$ and $K_{enc}$ are dimensioned in [V/rad/sec] and in [pulses/rad], respectively. Since the back emf constant $K_m$ has units in [V/rad/sec], and gain constant A and $K_g$ are dimensionless, the gain constants of blocks 233, 229, and 242 are dimensioned as $K_i$[pulses/V], $K_i'$[sec], and $K_i''$[sec]i, respectively. The differentiation of the voltage command $\Delta V_i(s)$, performed in block 231, has units in [1/sec] so that the velocity signal voltage, available at point 230, is expressed in [V/sec] for the voltage command $\Delta V_i(s)$, applied to terminal 232, expressed in Volts. Thus, the outputs of the blocks 233, 229, and 242, are in pulses (lead 234), Volts (lead 228), and Volts (lead 243). As explained earlier, the position error voltage available on lead 241 is in analog form and is also expressed in Volts. The current feedback circuit 259, which performs magnitude multiplication and phase shifting of the buffered current sense signal $KR\Delta I(s)$, can be considered characterized by a transfer function that will shortly be derived as H(s) whose magnitude and phase angle are shown in Eqs.(2) and (3) in the summary of the invention, for physical real time domain.

Assuming that, mathematically and in a complex domain s, the processed current feedback signal on lead 203 is obtained by multiplying the Laplace-transformed buffered current sense signal $KR\Delta I(s)$ with the complex transfer function H(s), i.e that the Laplace-transformed processed current feedback signal on lead 203 is equal to $H(s)KR\Delta I(s)$, the transadmittance of parameter-free zero-impedance converter of FIG. 2, for $R<<|Z_{ekv}(s)|$ frequency (s) domain is $$\Delta I(s)/\Delta V_{\epsilon 1}(s)=A/\{Z_{ekv}(s)-H(s)RAK+K_m(1/sJ)G_M(s)\} \quad (30)$$

The transfer function of the embodiment of FIG. 2, naturally defined in the complex frequency (s) domain is, for $K_i''=0$ $$\Delta\theta_0(s)/\Delta\theta_i(s)=[T_1'(s)+T_4'(s)]/[T_1(s)+T_2(s)+T_4(s)] \quad (31)$$

where $$T_1'(s)=G_M(s)G_R'(s)AK_iK_cK_p \quad (32)$$

$$T_4'(s)=G_M(s)G_R'(s)AsK_i' \quad (33)\text{ps}$$

$$T_1(s)=G_M(s)G_R'(s)A(K_gK_{enc}K_cK_p+sK_v) \quad (34)$$

$$T_2(s)=s^2JT_3(s) \quad (35)$$

$$T_3(s)=Z_{ekv}(s)-H(s)RAK \quad (36)$$

$$T_4(s)=G_M(s)sK_m \quad (37)$$

A transfer function from the input to the converter (point 201) to the angular shaft speed (point 222) is $$\Delta\omega_0(s)/\Delta V_{\epsilon 1}(s)=A/\{[[Z_{ekv}(s)sJ+K_mG_M(s)][Z_{ekv}(s)-H(s)RAK]]/[G_M(s)Z_{ekv}(s)]++[H(s)RAKK_m]/[Z_{ekv}(s)]\} \quad (38)$$

The dynamic stiffness of the embodiment of FIG. 2, for $R<<|Z_{ekv}(s)|$, is $$-\Delta T_l(s)/\Delta\theta_0(s)=[T_1(s)=T_2(s)+T_4(s)]/T_3(s) \quad (39)$$

where functions $T_1(s)$ through $T_4(s)$ have been obtained in Eqs.(34) through (37).

Denoting a part of the output angular shaft position response due to the input position command in Eq.(31) $\Delta\theta_{0i}(s)$, and a part of the output angular shaft position response due to the load torque disturbance in Eq.(39) $\Delta\theta_{0l}(s)$, *the disturbance rejection ratio of the embodiment of FIG. 2 is*

$$D_{rr}(s)=\Delta\theta_{0i}(s)/\Delta\theta_{0l}(s)=\{[T_1'(s)+T_4'(s)]\Delta\theta_i(s)\}/T_3(s)[-\Delta T_l(s)]\} \quad (40)$$

Substituting Eq.(36) in Eq.(40) it is seen that the embodiment of FIG. 2 becomes of infinite disturbance rejection ratio for the complex transfer function, characterizing in complex frequency domain block 259. H(s) as given below $$H(s)=Z_{ekv}(s)/RAK \quad (41)$$

Therefore, for the condition in Eq.(41), Eq.(40) becomes $$D_{rr}(s)=\infty \quad (42)$$

The condition for the infinite disturbance rejection ratio, as given in Eq.(41), is equivalent to producing an infinite transadmittance part in series with a finite transadmittance part, as seen by substituting Eq.(41) in Eq.(30), yielding the resulting transadmittance being equal to the finite transadmittance part $$\Delta I(s)/\Delta V_{\epsilon 1}(s)=A/\{K_m(1/sJ)G_M(s)\} \quad (43)$$

The infinite disturbance rejection ratio property, Eq.(42), is also equivalent to a load independence of the embodiment of FIG. 2, as seen by substituting Eq.(41) in Eq.(39).

Further, the algorithm for the infinite disturbance rejection ratio, as given in Eq.(41), reduces transfer function of Eq.(38) to a real number independent of time constants associated with the complex impedance $Z_{ekv}(s)$ and of mechanical parameter such as system moment of inertia J. Substituting Eq.(41) in Eq.(38)

$$\Delta\omega_0(s)/\Delta V_{\epsilon 1}(s)=A/K_m \quad (44)$$

Eq.(44) implies that all electrical and mechanical time constants in the system in FIG. 2 have been brought to zero while keeping finite loop gain(s)! The velocity and the position loop gain for the algorithm of Eq.(41) are, respectively $$LG_v(s)=K_vG_R'(s)(A/K_m) \quad (45)$$

and $$LG_p(s)=K_gK_{enc}K_cK_pG_R'(s)A]s\} \quad (46)$$

Eqs.(45) and (46) imply a perfectly stable system wherein transfer function $G_R'(s)$ is simply designed for any desired gain/phase margin. The design of transfer function $G_R'(s)$ is actually very much simplified as the embodiment of FIG. 2 is made of infinite disturbance rejection ratio (already shown) and of zero order/instantaneous response (will be shown next) due to the algorithms given in Eqs.(2) (3), (6), (7), and (8), none of which is dependent on $G_R'(s)$.

Next, it will be shown that the algorithm in Eq.(41) also reduces the order of the system transfer function, originally given in Eq.(31). Substituting Eq.(41) in Eq.(31)

$$\Delta\theta_O(s)/\Delta\theta_i(s)=G_O[1+s\tau_z[/]1+sT_p(s)] \quad (47)$$

where $$G_O=K_i/K_gK_{enc} \quad (48)$$

$$\tau_z=K_i'/K_iK_cK_p \quad (49)$$

$$T_p(s)=[G_R'(s)AK_v+K_m]/[G_R'(s)AK_gK_{enc}K_cK_p] \quad (50)$$

From Eq.(47), the zero order dynamics is achieved for $$\tau_z=T_p(s) \quad (51)$$

which implies that time constant $\tau_z$ should become a function of s. By setting a gain constant $K_i'$, which characterizes the velocity direct path circuit 229, a function of s, the zero dynamics, achieved for condition of Eq.(51), is obtained by substituting Eqs.(49) and (50) in Eq.(51) yielding $$K_i'(s)/K_i=[G_R'(s)AK_v+K_m]/[G_R'(s)AK_gK_{enc}] \quad (52)$$

in which case the system transfer function of Eq.(47) becomes $$\Delta\theta_O(s)/\Delta\theta_i(s)=G_O \quad (53)$$

The condition for zero order dynamics, as given in Eq.(52) can be resolved in two independent conditions, one for position and another for velocity loop, by synthesizing the respective gain constants as given in Eq.(6) and repeated here $$K_i=mK_{enc}K_g \quad (54)$$

and $$K_i'(s)=mK_v+mK_m/G_r'(s)A \quad (55)$$

in which case Eq.(53) becomes $$\Delta\theta_O(s)/\Delta\theta_i(s)=m \quad (56)$$

The zero order dynamics provided in Eq.(56) implies instantaneous response to input command with associated zero error in both transient and steady state. The condition in Eq.(55) is simply implemented, with reference to FIG. 2 and remembering that Eq.(31) was originally derived for $K_i'$32 0, by implementing the velocity direct path circuit 229 such that it is characterized by a gain constant given in Eq.(7) and repeated here $$K_i'=mK_v \quad (57)$$

and by implementing the feedforward circuit 242 such that it is characterized by a gain constant given in Eq.(8) and repeated here $$K_i'=mK_m/A \quad (58)$$

The condition in Eq.(41) therefore provided for the infinite disturbance rejection ratio, resulting in Eq.(42), and the conditions in Eqs.(41), (54), (57), and (58) provide for zero order dynamics with respect to the input command, resulting in Eq.(56).

In order to synthesize the algorithm in Eq.(41) in a parameter-free manner, i.e., without having to know values of both resistive and reactive components within the impedance of interest $Z_{ekv}(s)$. it is to be realized that the (Laplace) complex valued impedance, which is impedance $Z_{ekv}(s)$, is a dynamic impedance in terms of that it contains both transient and steady state parts. Therefore, in order to synthesize in real time impedance $Z_{ekv}(s)$, one has to provide real time measurements of true rms voltage and current associated with the impedance $Z_{ekv}(s)$ in both transient and steady state, as well as measurements of phase displacement between the voltage and the current in both transient and steady state. As explained already in connection with FIG. 1 and with reference to the same subject, the (dynamic) impedance $Z_{ekv}(s)$ can then be expressed as a ratio of the true rms's of voltage and current in its magnitude part, and as a phase difference between the voltage and the current in its phase part. Due to the physical nature of any measurements, as, again, explained earlier in connection with FIG. 1, the real part of the complex-valued function H(s), consisting of magnitude and phase term, is provided by real time measurements of true rms of voltage and current and of their phase displacement, and incorporating the appropriate elements as discussed with reference to FIG. 2. Such a synthesized real part of the complex-valued function H(s) is physical representation of that function in both steady state and transient because the measurements, on which it is based, are taken continuously and in real time in both steady state and transient.

It was already explained, with reference to FIG. 1, that an alternative system approach of convolving an impulse response h(t), obtained by inverse Laplace transform from H(s), with the buffered current sense signal KRΔi(t), would not provide a desired result because of the lack of physical meaning of inverse Laplace of $$Z(s)=\frac{V(s)}{I(s)}$$

Therefore, for real time continuous measurements as explained in connection with FIG. 2, the algorithm in Eq.(41) reduces to multiplying the instantaneous value of the buffered current sense signal KRΔi(t) with a magnitude of the real part of the transfer function H(s), i.e., with |Re[H(s)|, and shifting the instantaneous phase of the buffered current sense signal KRΔi(t) for a phase of the real part of the transfer function H(s), i.e., for ∢{Re[H(s)]}, where |Re[H(s)]| and ∢{Re[H(s)]} are given in Eqs.(2) and (3), respectively, and repeated here $$|Re[H(s)]|=V_{rms}/RAKI_{rms} \quad (59)$$

$$\sphericalangle\{Re[H(s)]\}=\sphericalangle_v-\sphericalangle_i \quad (60)$$

where $^V$rms is a true rms of a resulting voltage across the impedance of interest; with reference to FIG. 2 the impedance of interest is an electric motor equivalent impedance $Z_{ekv}(s)$, and the resulting voltage across the $Z_{ekv}(s)$ is due to the voltage applied to the motor and opposed by a back emf, $I_{rms}$ is a true rms of a current through the impedance of interest, $\sphericalangle_v$ is an instantaneous phase of the resulting voltage across the impedance of interest, and $\sphericalangle_i$ is an instantaneous phase of the current through the impedance of interest.

The remaining parameters in Eq.(59) were described earlier.

With reference to FIG. 2, Eqs.(43), (44), and (56) imply that the parameter-free zero-impedance converter, in addition to having eliminated all time constants associated with an electric motor impedance $Z_{ekv}(s)$ (and thus effectively forced the impedance to zero), also eliminated any dependence on a torque producing mechanisms, denoted by $G_M(s)$, and provided an infinite robustness of the embodiment of FIG. 2 with respect to the system moment of inertia J. The infinite transadmittance part of the parameter-free zero-impedance converter should be interpreted as a zero transimpedance part of the converter and, with reference to FIG. 2, as forcing the converter input voltage change $\Delta V_{\epsilon 1}(s)$ to zero while maintaining a finite and instantaneous current change $\Delta I(s)$ through the impedance of interest $Z_{ekv}(s)$, which is nulled out by a negative term $$\{RAK\} \cdot \{V_{rms} \sphericalangle_v / RAKI_{rms} \sphericalangle_i\}.$$

Since the input voltage to the parameter-free zero-impedance converter $\Delta V_{68\ 1}(s)$ is in actuality an error voltage obtained through the action of the external (position and velocity) negative feedback loops, it follows that by forcing this voltage to zero the corresponding errors produced by these loops (position and velocity error) are forced to zero in case in which these errors are due to a finite impedance $Z_{ekv}(s)$ It turns out, as seen from Eq.(39), that these errors are due to a finite impedance $Z_{ekv}(s)$ when load torque, acting on the drive system, changes. Therefore, the parameter-free zero-impedance converter, with its property of the infinite transadmittance portion, i.e., with its ability to force impedance of interest $Z_{ekv}(s)$ to zero, forces zero errors in both position and velocity loop when load changes, yielding a load independence of angular shaft position and velocity in both transient and steady state, i.e., yielding an infinite disturbance rejection ratio in both transient and steady state for the true rms values $V_{rms}$ and $I_{rms}$ and the instantaneous phases $\sphericalangle_v$ and $\sphericalangle_i$ of voltage and current associated with the impedance of interest $Z_{ekv}(s)$ being measured continuously and in real time in both steady state and transient and processed as explained in connection with FIG. 2.

As mentioned in connection with FIG. 1, the electric motor drive systems are in general a control systems designed to follow an input position or velocity command in the pressence of load changes so that, as seen from the development of this embodiment, illustrated in FIG. 2, these tasks are done in an ultimate way by synthesizing the embodiment to provide for an infinite disturbance rejection ratio and zero order dynamics and employing any kind of electric motor including dc, synchronous and asynchronous ac, and step motors, and without need to know parameters of the motor impedance as the impedance is being continuously synthesized from the real time measurements of voltage and current associated with the impedance so that the embodiment of FIG. 2 operates in a self-sufficient (self-adaptive/self-tunable way. In that respect, both embodiments, shown in FIGS. 1 and 2, are ideal adaptive control systems which provide ideal properties of a control systems applied to electric motor drive systems. As previously mentioned, in connection with FIG. 1, the physical realization of the prescribed functionalism, i.e., circuitry, in the positive current feedback loop consists of measuring circuits: true rms meters and phase meters, arithmetic circuits: dividers, multipliers and algebraic summers, and phase shifter; all of these circuits being based on classical and well known principles which were not elaborated. Again, due to the relative complexity of the prescribed circuitry (prescribed functionalism), a digital/software implementation may be preferred to realize the positive current feedback loop, according to the description of the embodiment as provided with reference to FIG. 2. Sampling frequencies in a MHz range can be used to provide continuous true rms and phase measurements for both steady state and transient, as compared to generally much lower switching/carrier frequency used in a PWM portion of the embodiment. Although a commercially available circuits may be used in prototyping the embodiments, such as Keithley System Digitizer 194A operating at either IMHz (with 8-bit resolution) or 100 kHz (with 16-bit resolution and equipped with two channels and additional arithmetics to obtain a ratio of true rms's of the variables in question, or HP Jetwork HP3575A, or HP4192A,(e.g., a true rms obtained from n voltage samples $V_i$ as $$\left( \left\{ \sum_{i=0}^{n-1} (V_i)^2/n \right\}^{\frac{1}{2}} \right)$$

or systems based on measurements in frequency domain and, consequently, providing the results in time domain, it is preferred to implement the measurements and the arithmetics part in the current loop of the embodiments through a dedicated circuitry based on the descriptions of the embodiments. This last statement also implies various changes and modifications that can be made in implementing the algorithms provided for both FIG. 1 and FIG. 2, within the scope of the inventive concept.

Also, the applications of the parameter-free zero-impedance converter to a capacitive impedance may be performed without departing from the scope of the inventive concept. In such a case, the parameter-free zero-impedance converter would, in accordance with its properties described in this application, provide for an instantaneous change of voltage across the capacitive impedance (of course, within the physical limitations of any physical system including finite energy levels of available sources, finite power dissipation capability of available components, and finite speed of transition of control signals).

Finally, the applications of the parameter-free zero-impedance converter in case of inductive impedances are not limited to the electric motor drive systems, described in this application, but are rather possible in all cases in which the converter properties, described here, are needed.

We claim:

1. A method for parameter free synthesizing electric motor drive system of infinite disturbance rejection ratio and zero order dynamics including parameter free zero impedance converter comprising:

accepting a source of electrical energy of a constant voltage at an input to a power converter, coupling mechanically a shaft of an electric motor to a load to be driven at an output, controlling a power flow from said input to said output, modulating said power converter for the control of said power flow in a pulse width modulation manner, supplying a total control signal for modulating said power converter, supplying a voltage feedback signal from a voltage applied to said electric motor, feeding back said voltage feedback signal through a voltage feedback circuit in a negative feedback loop with respect to a direct path signal, supplying an input velocity command obtained as a differentiated input position command, passing said input velocity command through a direct path circuit; thereby producing said direct path signal, passing said input velocity command through a feedforward circuit; thereby producing a feedforward signal, passing a voltage error signal, obtained as the algebraic sum of said direct path signal and said voltage feedback signal fed through said voltage feedback circuit, through a forward circuit; thereby producing a forward control signal proportional to the algebraic sum of said direct path signal and said voltage feedback signal, sensing a current through said electric motor, passing the sensed current signal through a buffering circuit; thereby producing a buffered current sense signal, passing said buffered current sense signal through a current sense gain circuit; thereby producing a processed current sense signal, measuring continuously and in real time a true root mean square value of said processed current sense signal; thereby producing a true root mean square value of said processed current sense signal, supplying a sensed back electromotive force signal, sensing an angular shaft speed of the motor by a tach and passing the tach signal through a tach gain circuit; thereby producing said sensed back electromotive force signal, subtracting said sensed back electromotive force signal from a voltage sense signal in a voltage algebraic summing circuit; thereby producing an instantaneous resultant voltage, sensing said voltage applied to said electric motor; thereby producing said voltage sense signal, measuring continuously and in real time a true root mean square value of said instantaneous resultant voltage; thereby producing a true root mean square value of said instantaneous resultant voltage, measuring continuously and in real time a phase of said buffered current sense signal; thereby producing a buffered current sense signal phase, measuring continuously and in real time a phase of said total control signal; thereby producing a control signal phase, dividing said true root mean square value of said instantaneous resultant voltage with said true root mean square value of said processed current sense signal; thereby producing a magnitude of real part of current feedback transfer function, subtracting said buffered current sense signal phase from said total control signal phase; thereby producing a phase of real part of current feedback transfer function, multiplying in a current feedback circuit magnitude of said buffered current sense signal by a value of said magnitude of real part of current feedback transfer function and shifting in said current feedback circuit the phase of buffered current sense signal for a value of said phase of real part of current feedback transfer function; thereby producing a processed current feedback signal, feeding back said processed current feedback signal in a positive feedback loop with respect to said forward control signal and said feedforward signal and summing the three signals, supplying said total control signal, obtained as the sum of said forward control signal and said feedforward signal and said processed current feedback signal, for modulating said power converter for the control of the flow of power from the input electrical source to the output mechanical load, whereby impedance of said electric motor is being forced to zero making an angular shaft position and speed independent of said load in a parameter free manner with respect to the impedance parameters and making a transfer function form the input position command to the angular shaft position a constant and therefore of zero order in said parameter free manner.

2. The method of claim 1 wehrein said magnitude of real part of current feedback transfer function is synthesized using an equation in real time domain $$|Re[H(s)]| = V_{rms}/[RAKI_{rms}/(1+AK_eK_f)]$$

in said equation $V_{rms}$ being a true root mean square value of a resulting voltage across the motor impedance, $I_{rms}$ being a true root mean square value of a current through the motor impedance, R being a transresistance of a motor current sense device, A being a voltage gain of a pulse width modulation control and power stage, K being a voltage gain of a buffering differential amplifier, $K_e$ being a voltage gain of a voltage feedback circuit, and $K_f$ being a voltage gain of a forward circuit, and said phase of real part of current feedback transfer function is synthesized using an equation in real time domain $$\measuredangle\{Re[H(s)]\} = \measuredangle_v < _i$$

in said equation $\measuredangle_v$ being an instantaneous phase of the resulting voltage across the motor impedance, and $\measuredangle_i$ being an instantaneous phase of the current through the motor impedance, and both the magnitude and phase synthesized values being applied to a current feedback circuit in a positive feedback loop.

3. The method of claim 2 wherein said current feedback circuit in said positive feedback loop is physically implemented using an arithmetic multiplier circuit followed by a phase shifting circuit.

4. The method of clam 3 wherein said arithmetic multiplier circuit multiplies magnitude of a buffered current sense signal by a value of the magnitude of real part of current feedback transfer function and said phase shifting circuit shifts phase of said buffered current sense signal for a value of the phase of real part of current feedback transfer function.

5. The method of claim 1 wherein said direct path circuit is synthesized using an equation providing transfer function of said direct path circuit $$K_i = mK_mK_e$$

in said equation m being a scaling constant equal to said transfer function from the input position command to the angular shaft position, $K_m$ being a back electromotive force constant characterizing production of a back electromotive force proportional to said angular shaft speed of said electric motor, and $K_e$ being a voltage gain of a voltage feedback circuit.

6. The method of claim 5 wherein said equation providing transfer function of said direct path circuit is physically implemented, thereby implementing said direct path circuit, as a constant gain circuit.

7. The method of claim 1 wherein said feedforward circuit is synthesized using an equation providing transfer function of said feedforward circuit $$K_1' = mK_m/A$$

in said equation m being a scaling constant equal to said transfer function from the input position command to the angular shaft position, $K_m$ being a back electromotive force constant characterizing production of a back electromotive force proportional to said angular shaft speed of said electric motor, and A being a voltage gain of a pulse width modulation control and power stage.

8. The method of claim 7 wherein said equation providing transfer function of said feedforward circuit is physically implemented, thereby implementing said feedforward circuit, as a constant gain circuit.

9. A method for parameter free synthesizing electric motor drive system of infinite disturbance rejection ratio and zero order dynamics including parameter free zero impedance converter comprising:

accepting a source of electrical energy of a constant voltage at an input to a power converter, coupling mechanically a shaft of an electric motor to a load to be driven at an output, controlling a power flow from said input to said output, modulating said power converter for the control of said power flow in a pulse width modulation manner, supplying a total control signal for modulating said power converter, supplying position feedback pulses, feeding back said position feedback pulses and comparing their frequency and phase with frequency and phase of position command pulses in a phase frequency detector in a negative feedback manner; thereby producing a position error voltage proportional to a difference in frequency and phase between said position command pulses and said position feedback pulses, supplying a position command obtained as a voltage, passing said position command through a position direct path circuit; thereby producing said position command pulse, passing said position command through a differentiation circuit; thereby producing a velocity signal voltage, passing said velocity signal voltage through a velocity direct path circuit; thereby producing a velocity command voltage, passing said velocity signal voltage through a feedforward circuit; thereby producing a feedforward signal, supplying a velocity feedback signal, feeding back said velocity feedback signal in a negative feedback loop with respect to said velocity command voltage and said position error voltage and summing them; thereby producing a resulting error voltage, passing said resulting error voltage through a cascade connection of a stabilizing network and a control circuit; thereby producing a control signal proportional to the algebraic sum of said velocity command voltage and said velocity feedback signal and said position error voltage, sensing a current through said electric motor, passing the sensed current signal through a buffering circuit; thereby producing a buffered current sense signal, passing said buffered current sense signal through a current sense gain circuit; thereby producing a processed current sense signal, measuring continuously and in real time a true root mean square value of said processed current sense signal; thereby producing a true root mean square value of said processed current sense signal, supplying a sensed back electromotive force signal, sensing an angular shaft sped of the motor by a tach and passing the tach signal through a tach gain circuit; thereby producing said sensed back electromotive force signal, subtracting said sensed back electromotive force signal from a voltage sense signal in a voltage algebraic summing circuit; thereby producing an instantaneous resultant voltage, sensing a voltage applied to said electric motor; thereby producing said voltage sense signal, measuring continuously and in real time a true root mean square value of said instantaneous resultant voltage; thereby producing a true root mean square value of said instantaneous resultant voltage, measuring continuously and in real time a phase of said buffered current sense signal; thereby producing a buffered current sense signal phase, measuring continuously and in real time a phase of said total control signal; thereby producing a total control signal phase, dividing said true root mean square value of said instantaneous resultant voltage with said true root mean square value of said processed current sense signal; thereby producing a magnitude of real part of current feedback transfer function, subtracting said buffered current sense signal phase from said total control signal phase; thereby producing a phase of real part of current feedback transfer function, multiplying in a current feedback circuit magnitude of said buffered current sense signal by a value of said magnitude of real part of current feedback transfer function and shifting in said current feedback circuit the phase of buffered current sense signal for a value of said phase of real part of current feedback transfer function; thereby producing a processed current feedback signal, feeding back said processed current feedback signal in a positive feedback loop with respect to said control signal and said feedforward signal and summing them, supplying said total control signal, obtained as the sum of said control signal and said feedforward signal and said processed current feedback signal, for modulating said power converter for the control of the flow of power from the input electrical source to the output mechanical load, whereby impedance of said electrical motor is being forced to zero making an angular shaft position and speed independent of said load in a parameter free manner with respect to the impedance parameters and making a transfer function from said position command to said angular shaft position a constant and therfore of zero order in said parameter free manner.

10. The method of claim 9 wherein said magnitude of real part of current feedback transfer function is synthesized using an equation in real time domain $$|Re[H(s)]| = V_{rms}/RAKI_{rms}$$

in said equation $V_{rms}$ being a true root mean square value of a resulting voltage across the motor impedance, $I_{rms}$ being a true root mean square value of a current through the motor impedance, R being a transresistance of a motor current sense device, A being a voltage gain of a pulse width modulation control and power stage, and K being a voltage gain of a buffering differential amplifier, and said phase of real part of current feedback transfer function is synthesized using an equation in real time domain $$\measuredangle\{Re[H(s)]\} = \measuredangle_v - \measuredangle_i$$

in said equation $\measuredangle_v$ being an instantaneous phase of the resulting voltage across the motor impedance, and $\measuredangle_i$ being an instantaneous phase of the current through the motor impedance, and both the magnitude and phase synthesized values being applied to a current feedback circuit in a positive feedback loop.

11. The method of claim 10 wherein said current feedback circuit in said positive feedback loop is physically implemented using an arithmetic multiplier circuit followed by a phase shifting circuit.

12. The method of claim 11 wherein said arithmetic multiplier circuit multiplies magnitude of a buffered current sense signal by a value of the magnitude of real part of current feedback transfer function and said phase shifting circuit shifts phase of said buffered current sense signal for a value of the phase of a real part of current feedback transfer function.

13. The method of claim 9 wherein said position direct path circuit is synthesized using an equation providing transfer function of said position direct path circuit $$K_i = mK_{enc}K_g$$

in said equation m being a scaling constant equal to said transfer function from said position command to said angular shaft position, $K_{enc}$ being a gain constant of a digital encoder, and $K_g$ being a gear ratio constant of a gear box.

14. The method of claim 13 wherein said equation providing transfer function of said position direct path circuit is physically implemented, thereby implementing said position direct path circuit, as a constant gain circuit.

15. The method of claim 9 wherein said velocity direct path circuit is synthesized using an equation providing transfer function of said velocity direct path circuit $$K_i' = mK_v$$

in said equation m being a scaling constant equal to said transfer function from said position command to said angular shaft position, and $K_v$ being a gain constant of a tach.

16. The method of claim 15 wherein said equation providing transfer function of said velocity direct path circuit is physically implemented, thereby implementing said velocity direct path circuit, as a constant gain circuit.

17. The method of claim 9 wherein said feedforward circuit is synthesized using an equation providing transfer function of said feedforward circuit $$K_i'' = mK_m/A$$

in said equation m being a scaling constant equal to said transfer function from said position command to said angular shaft position, $K_m$ being a back electromotive force constant characterizing production of a back electromotive force proportional to said angular shaft speed of said electric motor, and A being a voltage gain of a pulse width modulation control and power stage.

18. The method of claim 17 wherein said equation providing transfer function of said feedforward circuit is physically implemented, thereby implementing said feedforward circuit, as a constant gain circuit.

* * * * *

UNITED STATES PATENT AND TRADEMARK OFFICE
CERTIFICATE OF CORRECTION

PATENT NO. : 4,973,174

DATED : 11/27/90

INVENTOR(S) : Novica A. Losic and Ljubomir Dj. Varga

It is certified that error appears in the above-identified patent and that said Letters Patent is hereby corrected as shown below:

Col.2, line 45, change "$/(1=AK_eK_f)]$" to —$/(1+AK_eK_f)]$—.

Col.2, line 56, change "$=\}_v\}_i$" to —$=\}_v-\}_i$—.

Col.4, line 4, delete the first occurence of word "to".

Col.5, lines 18-19, change "$=V_{rms}\{_v/I_{rms}\{_i$" to —$=V_{rms}\}_v/I_{rms}\}_i$—.

Col.6, line 29, change "opposite" to —opposition—.

Col.8, line 39, change "ins" to —instantaneous—.

Col.9, line 67, change "$K_i32\ mK_mK_e$" to —$K_i=mK_mK_e$—.

Col.10, line 38, change "$\Delta I(s)/\Delta V_{68}\ _1(s)=$" to —$\Delta I(s)/\Delta V_{\varepsilon 1}(s)=$—.

Col.10, line 46, change "$=[T_1'(s)=T_4'(s)]/[T_1(s)=T_2(s)+T_4(s)]$" to —$=[T_1'(s)+T_4'(s)]/[T_1(s)+T_2(s)+T_4(s)]$—.

Col.11, line 1, change "$\Delta\omega_o(s)/\Delta V_{\omega 1}(s)=$" to —$\Delta\omega_o(s)/\Delta V_{\varepsilon 1}(s)=$—.

Col.11, line 18, change "$\{]T_1'(s)=T_4'(s)]\Delta\Theta_i(s)\}$" to —$\{[T_1'(s)+T_4'(s)]\Delta\Theta_i(s)\}$—.

Col.12, line 52, change "desire" to —desired—.

Col.12, line 55, change "physic" to —physical—.

Col.13, line 5, change "$\}_v\}_i$" to —$\}_v-\}_i$—.

Col.13, line 36, change "the impedance interest" to —the impedance of interest—

UNITED STATES PATENT AND TRADEMARK OFFICE
CERTIFICATE OF CORRECTION

PATENT NO. : 4,973,174

DATED : 11/27/90

INVENTOR(S) : Novica A. Losic and Ljubomir Dj. Varga

It is certified that error appears in the above-identified patent and that said Letters Patent is hereby corrected as shown below:

Col.13, lines 37 to 41, change "$\cdot\{V_{rms\ v}/[RAKI_{rms\ i}\ (1+AK_eK_f)]\}$" to —$\cdot\{V_{rms}\}_v/[RAKI_{rms}\}_i/(1+AK_eK_f)]\}$—.

Col.14, line 59, change "use" to —used—.

Col.17, line 67, change "$\Delta V_{68\ 1}(s)$" to —$\Delta V_{\varepsilon 1}(s)$—.

Col.22, line 4, change "$=[T_1(s)=T_2(s)+T_4(s)]/T_3(s)$" to —$=[T_1(s)+T_2(s)+T_4(s)]/T_3(s)$—.

Col.22, line 61, change "$LG_p(s)=K_gK_{enc}K_cK_pG'_R(s)A]s\}$" to —$LG_p(s)=K_gK_{enc}K_cK_pG'_R(s)A/\{[K_m+K_vG'_R(s)A]s\}$—.

Col.23, line 8, change "[/]" to —]/[—.

Col.23, line 57, change "$K'_i 32\ 0$" to —$K''_i=0$—.

Col.23, line 67, change "$K'_i=mK_m/A$" to —$K''_i=mK_m/A$—.

Col.25, line 32, change "$\Delta V_{68\ 1}(s)$" to —$\Delta V_{\varepsilon 1}(s)$—.

Col.28, line 52, change "$\}\{Re[H(s)]\}=\}_v<_i$" to —$\}\{Re[H(s)]\}=\}_v-\}_i$—.

UNITED STATES PATENT AND TRADEMARK OFFICE

CERTIFICATE OF CORRECTION

PATENT NO. : 4,973,174

DATED : 11/27/90

INVENTOR(S) : Novica A. Losic and Ljubomir Dj. Varga

It is certified that error appears in the above-identified patent and that said Letters Patent is hereby corrected as shown below:

Col.29, line 24, change "$K_l'=mK_m/A$" to —$K_i'=mK_m/A$—.

Signed and Sealed this

Twenty-first Day of April, 1992

*Attest:*

HARRY F. MANBECK, JR.

*Attesting Officer*

*Commissioner of Patents and Trademarks*